(12) United States Patent
Sakamoto (10) Patent No.: US 11,909,272 B2
(45) Date of Patent: Feb. 20, 2024

(54) OIL-COOLING STRUCTURE FOR MAGNETS OF MOTOR, AND MOTOR

(71) Applicant: TOYOTA JIDOSHA KABUSHIKI KAISHA, Aichi-ken (JP)

(72) Inventor: Hironobu Sakamoto, Okazaki (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 114 days.

(21) Appl. No.: 17/549,870

(22) Filed: Dec. 14, 2021

(65) Prior Publication Data
US 2022/0224178 A1    Jul. 14, 2022

(30) Foreign Application Priority Data

Jan. 8, 2021   (JP) ................................ 2021-002215

(51) Int. Cl.
*H02K 1/32*      (2006.01)
*H02K 1/276*     (2022.01)
*H02K 9/193*     (2006.01)

(52) U.S. Cl.
CPC ............. *H02K 1/32* (2013.01); *H02K 1/276* (2013.01); *H02K 9/193* (2013.01)

(58) Field of Classification Search
CPC .......... H02K 1/276; H02K 9/193; H02K 1/32
USPC ........................................................ 310/54
See application file for complete search history.

(56) References Cited

U.S. PATENT DOCUMENTS

| | | | | |
|---|---|---|---|---|
| 5,889,342 A * | 3/1999 | Hasebe | ..................... | H02K 9/19 310/156.19 |
| 7,952,240 B2 * | 5/2011 | Takenaka | ................. | H02K 1/20 310/58 |
| 8,492,941 B2 * | 7/2013 | Endo | ........................ | H02K 1/32 310/59 |
| 8,928,195 B2 * | 1/2015 | Ohashi | ................. | H02K 5/1737 310/58 |
| 9,154,006 B2 * | 10/2015 | Yamamoto | ........... | H02K 1/2766 |
| 9,627,943 B2 * | 4/2017 | Tokunaga | ................ | H02K 9/19 |
| 9,712,021 B2 * | 7/2017 | Watanabe | ................ | H02K 3/04 |
| 9,793,783 B2 * | 10/2017 | Hattori | ................. | H02K 1/2766 |
| 9,806,572 B2 * | 10/2017 | Yamagishi | ............... | H02K 9/19 |
| 10,658,895 B2 * | 5/2020 | Higashino | ................ | H02K 1/32 |
| 10,673,306 B2 * | 6/2020 | Handa | ..................... | H02K 9/00 |

(Continued)

FOREIGN PATENT DOCUMENTS

JP        2016158365 A    9/2016

*Primary Examiner* — Alex W Mok
(74) *Attorney, Agent, or Firm* — HAUPTMAN HAM, LLP (57) ABSTRACT

An oil-cooling structure for motor magnets, that includes: a pair of end plates that are disc-shaped and are mounted at both end portions of a rotor core; third oil paths formed at interiors of the end plates, and having axial direction portions that extend in an axial direction of a rotor shaft and are connected to axial direction end portions of second oil paths, respectively, and discharging portions that extend toward a radial direction outer side from axial direction outer side end portions of the axial direction portions and are open at end portions of the end plates; and angle mitigating members disposed in the third oil paths at corner portions formed by the axial direction portions and the discharging portions, configured to mitigate angles formed by the axial direction portions and the discharging portions in axial direction cross-sections that include the third oil paths.

4 Claims, 4 Drawing Sheets

(56) References Cited

U.S. PATENT DOCUMENTS

| | | | |
|---|---|---|---|
| 10,862,365 B2* | 12/2020 | Yamaguchi | H02K 5/203 |
| 10,862,373 B2* | 12/2020 | Ishikawa | H02K 9/19 |
| 2011/0074233 A1* | 3/2011 | Okada | H02K 1/32 |
| | | | 310/54 |
| 2012/0025642 A1* | 2/2012 | Onimaru | H02K 1/32 |
| | | | 310/64 |
| 2012/0299404 A1* | 11/2012 | Yamamoto | H02K 1/28 |
| | | | 310/61 |
| 2019/0238029 A1* | 8/2019 | Kajikawa | H02K 9/19 |
| 2020/0204021 A1* | 6/2020 | Kim | H02K 9/19 |
| 2020/0244124 A1* | 7/2020 | Kang | H02K 1/32 |
| 2020/0381968 A1* | 12/2020 | Wakui | H02K 1/32 |

* cited by examiner

OIL-COOLING STRUCTURE FOR MAGNETS OF MOTOR, AND MOTOR

CROSS-REFERENCE TO RELATED APPLICATION

This application is based on and claims priority under 35 USC 119 from Japanese Patent Application No. 2021-002215 filed on Jan. 8, 2021, the disclosure of which is incorporated by reference herein.

BACKGROUND

Technical Field

The present disclosure relates to an oil-cooling structure for magnets of a motor, and to a motor.

Related Art

Japanese Patent Application Laid-Open (JP-A) No. 2016-158365 discloses a structure having a first oil flow path that is formed in the interior of a rotor shaft, plural second oil flow paths that extend from the first oil flow path toward radial direction outer sides to as far as the reverse surfaces (oil reservoirs) of plural magnets that are disposed along the peripheral direction at the interior of a rotor, and plural third oil flow paths that communicate with the respective second oil flow paths (the oil reservoirs) and extend in the axial direction of the shaft along the reverse surfaces of the respective magnets. Due to the oil being made to flow along the reverse surfaces of the respective magnets due to the centrifugal force that accompanies rotation of the rotor, the plural magnets are cooled efficiently.

In the structure disclosed in JP-A No. 2016-158365, the supply of oil to the oil reservoirs depends on the rotational speed of the rotor (the motor) (the centrifugal force).

Accordingly, if the rotational speed of the motor is low, the amounts of oil that are supplied to the third oil flow paths from the second oil flow paths that extend toward radial direction outer sides decreases, and the amounts of oil that are supplied to the plural third oil flow paths becomes non-uniform. As a result, there is the concern that the performance of cooling the plural magnets that are disposed along the peripheral direction within the rotor core will become non-uniform. As a result, there is the concern that the temperatures of the plural magnets will become non-uniform, and the performances of the motor will deteriorate.

Namely, there is room for improvement with regard to the point of uniformizing the temperatures of the plural magnets regardless of the rotating speed of the motor.

SUMMARY

An aspect is an oil-cooling structure for motor magnets, that includes: a rotor shaft; a rotor core mounted at an outer peripheral surface of the rotor shaft, which rotates integrally with the rotor shaft; a plurality of magnets disposed along a peripheral direction at an interior of the rotor core, and respectively extending along an axial direction of the rotor shaft; an oil reservoir formed at an interior of the rotor shaft, to which oil is supplied from an exterior; a plurality of first oil paths extending from the oil reservoir at an interior of the rotor core in radial directions to a plurality of cooling oil holes that are formed at radial direction inner sides of the plurality of magnets, respectively; a plurality of second oil paths extending along the axial direction at radial direction inner sides of the magnets, respectively, and reaching axial direction end portions of the rotor core from the cooling oil holes; a pair of end plates that are disc-shaped and are mounted at both end portions of the rotor core; third oil paths formed at interiors of the end plates, and having axial direction portions that extend in the axial direction and are connected to axial direction end portions of the second oil paths, respectively, and discharging portions that extend toward a radial direction outer side from axial direction outer side end portions of the axial direction portions and are open at end portions of the end plates; and angle mitigating members disposed in the third oil paths at corner portions formed by the axial direction portions and the discharging portions, configured to mitigate angles formed by the axial direction portions and the discharging portions in axial direction cross-sections that include the third oil paths.

DETAILED DESCRIPTION

[First Embodiment]

An oil-cooling structure for magnets of a motor relating to a first embodiment is described with reference to FIG. 1 through FIG. 3B. Note that, in FIG. 2, in order to avoid complicating the drawing, only some of the reference numerals are shown, and others are omitted. Note that the respective drawings are schematic drawings, and the proportions of the members differ from actual proportions for convenience of explanation.

(Structure)

First, the structure of a motor 10 to which the oil-cooling structure of the present embodiment is applied is described. Note that, in the respective drawings, the axial direction is indicated as the arrow S direction, and the radial direction is denoted by arrow R.

Figure 1:
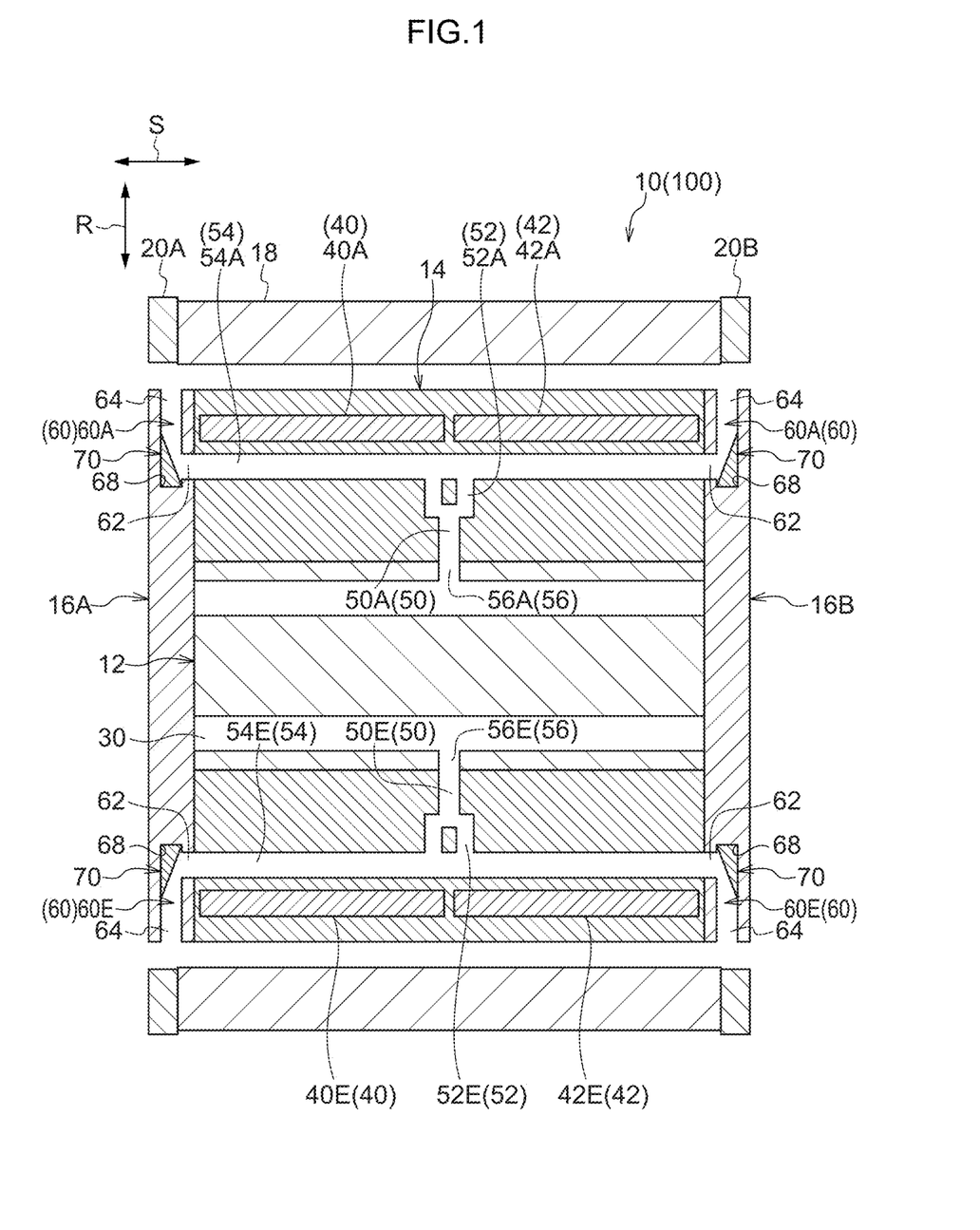
FIG. 1 is an axial direction cross-sectional view of a motor to which an oil-cooling structure for magnets of a motor relating to a first embodiment is applied.

As shown in FIG. 1, the motor 10 has a rotor shaft 12, a rotor core 14, end plates 16A, 16B, a stator core 18, and coil ends 20A, 20B.

The rotor shaft 12 is solid cylindrical, and an oil reservoir 30 that is annular and extends in the axial direction is formed at the interior of the rotor shaft 12. Oil for cooling (hereinafter called "oil") is supplied to the oil reservoir 30 from a supply source that is at an axial direction end portion.

The rotor core 14 is fit-together with the outer peripheral surface of the rotor shaft 12, and can rotate integrally with the rotor shaft 12.

Figure 2:
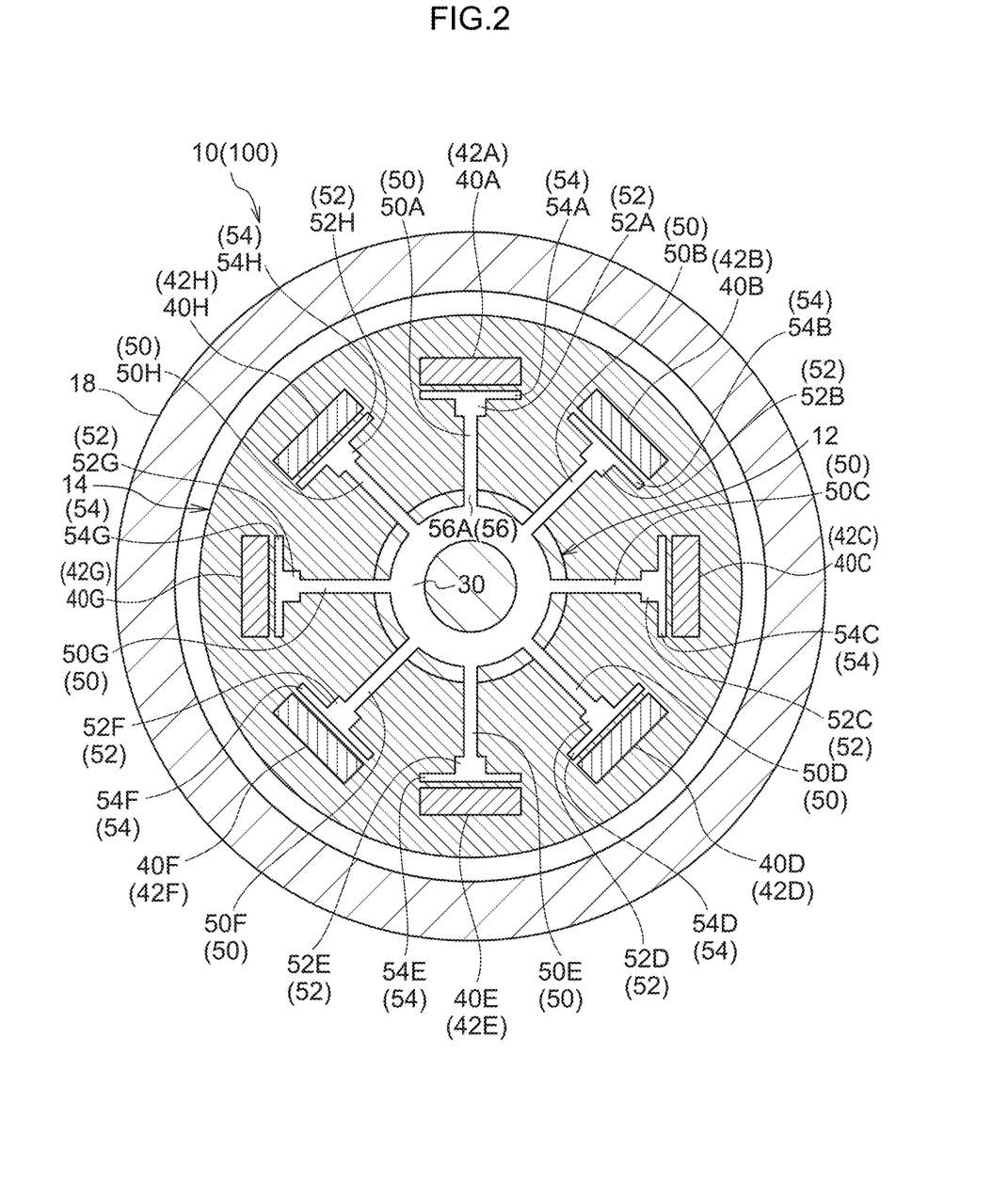
FIG. 2 is a radial direction cross-sectional view of the motor to which the oil-cooling structure for magnets of a motor relating to the first embodiment is applied.
Figure 3A:
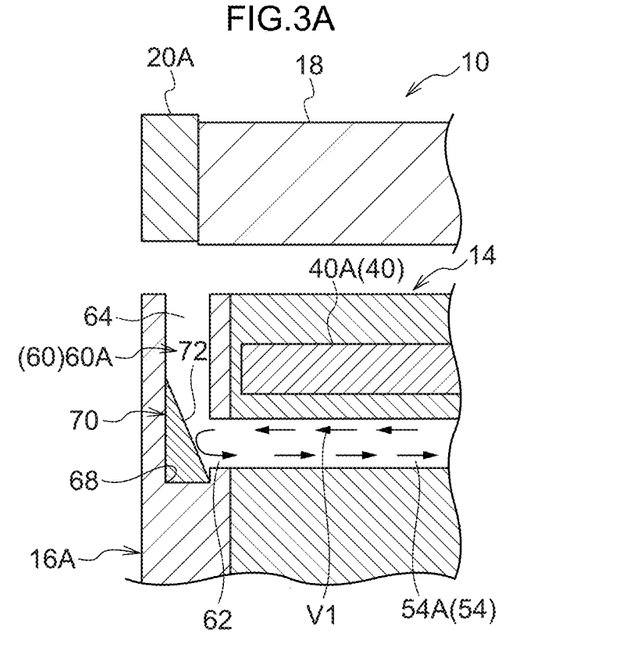
FIG. 3A is an axial direction cross-sectional view showing main portions of the motor to which the oil-cooling structure for magnets of a motor relating to the first embodiment is applied, and shows a time of low speed rotation of the motor.
Figure 3B:
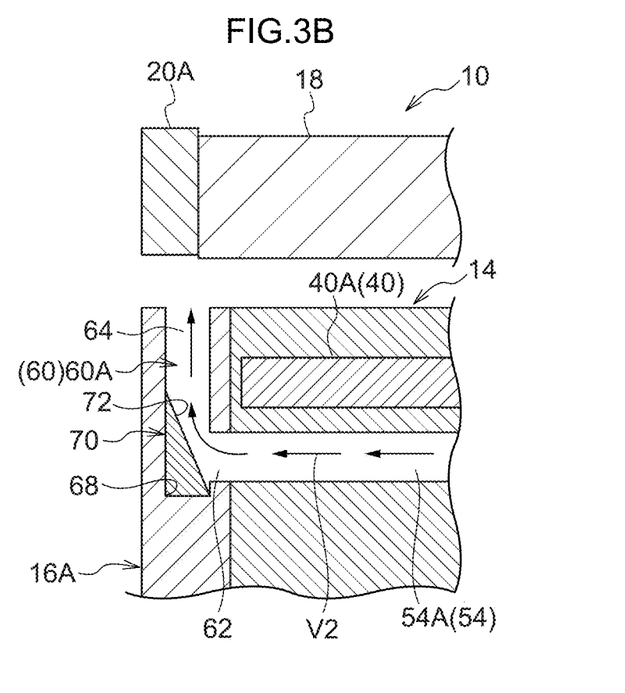
FIG. 3B is an axial direction cross-sectional view showing main portions of the motor to which the oil-cooling structure for magnets of a motor relating to the first embodiment is applied, and shows a time of high speed rotation of the motor.

As shown in FIG. 2, eight magnets 40A through 40H (42A through 42H) that are rectangular are disposed at the rotor core 14 at the radial direction outer side at a uniform interval in the peripheral direction. Note that, when differentiating between the magnets that are at the respective positions, letters A through H are appended to the reference numerals "40" and "42", and in other cases, the magnets are described as the "magnet 40" and the "magnet 42". Note that the same holds as well for first oil paths 50, cooling oil wells 52, second oil paths 54 and third oil paths 60 that are described hereinafter.

As shown in FIG. 1, two of the rectangular magnets 40, 42 are disposed so as to be lined-up in the axial direction at the respective positions in the peripheral direction of the rotor core 14.

As shown in FIG. 1 and FIG. 2, the first oil paths 50 that extend toward radial direction outer sides of the oil reservoir 30 of the rotor shaft 12, the cooling oil wells 52 that are provided at the radial direction outer side end portions of the first oil paths 50, and the second oil paths 54 that are provided so as to extend at the radial direction inner sides of the magnets 40, 42 from the cooling oil wells 52 to the axial direction end portions, are formed in the rotor core 14.

The first oil path 50 communicates with the oil reservoir 30 via a hole portion 56 that is provided in the outer peripheral wall of the rotor shaft 12. Note that, as shown in FIG. 2, the first oil paths 50A through 50H are provided respectively with respect to the magnets 40A through 40H, 42A through 42H that are disposed at eight places in the peripheral direction (i.e., eight of the first oil paths 50 are formed in a radial form).

Further, as shown in FIG. 1, the radial direction outer side end portion of the first oil path 50 faces an intermediate position between the magnet 40 and the magnet 42, the two of which are disposed so as to be lined-up in the axial direction.

The cooling oil well 52 is formed so as to face the radial direction inner side surfaces of the magnets 40, 42, at a position facing an axial direction range that includes the gap between the magnet 40 and the magnet 42.

The cooling oil well 52 has a larger diameter than the first oil path 50, and branched-off flow paths that are branched-off toward an axial direction one side and other side are formed thereat.

The second oil path 54 communicates with the cooling oil well 52 at the radial direction inner sides of the magnets 40, 42, and extends in the axial direction from an axial direction one end portion to the other end portion of the rotor core 14.

As shown in FIG. 1, the end plates 16A, 16B are mounted to the axial direction both end portions of the rotor shaft 12 and the rotor core 14 respectively, and are formed in disc shapes.

The eight third oil paths 60A through 60H for discharging oil (only the third oil paths 60A, 60E are shown in FIG. 1), which communicate with the second oil paths 54A through 54H respectively, are formed in the end plates 16A, 16B. The third oil path 60 has an axial direction portion 62 that extends from the axial direction inner side end surface of the end plate 16A, 16B toward the axial direction outer side, and a radial direction portion 64 that extends from the radial direction outer side end portion of the axial direction portion 62 toward the radial direction outer side.

Note that the radial direction portion 64 corresponds to the "discharging portion".

The axial direction inner side end portions of the axial direction portions 62 open at the axial direction inner side end surfaces of the end plates 16A, 16B (the rotor core 14 side end surfaces). Due to the end plates 16A, 16B being mounted to the rotor core 14 and the like, the axial direction portions 62 communicate with the second oil paths 54 of the rotor core 14.

The radial direction portions 64 are formed from the axial direction outer side end portions of the axial direction portions 62 so as to extend through the interiors of the end plates 16A, 16B toward the radial direction outer sides. The radial direction outer side end portions of the radial direction portions 64 open at the outer peripheral surfaces of the end plates 16A, 16B. Namely, the radial direction outer side end portions of the radial direction portions 64 face the inner peripheral surfaces of the stator core 18 and the coil end 20A, and open at the outer peripheral surfaces of the end plates 16A, 16B.

In an axial direction cross-section (see FIG. 1) that includes the third oil path 60 of the rotor core 14, the angle that is formed by the axial direction portion 62 and the radial direction portion 64 is a right angle.

Further, as shown in FIG. 1, FIG. 3A, FIG. 3B, FIG. 4A and FIG. 4B, an angle mitigating member 70, which is shaped as a right triangle as seen in an axial direction cross-section, is disposed at a corner portion 68 that is formed by the axial direction portion 62 and the radial direction portion 64 of the third oil path 60. The right-angled region of the angle mitigating member 70 abuts the corner portion 68, and an inclined surface 72 is disposed in a form of being exposed to the third oil path 60. Namely, the angle that is formed by the axial direction portion 62 and the radial direction portion 64 of the third oil path 60 is mitigated (enlarged) from a right angle due to the inclined surface 72, and the conduit sectional area of the third oil path 60 is decreased by the angle mitigating member 70 (a narrowed portion is provided at the third oil path 60).

The stator core 18 is annular and is disposed at the radial direction outer side of the rotor core 14 with a predetermined interval therebetween. The coil ends 20A, 20B that are annular are mounted to the axial direction both end portions of the stator core 18.

(Operation)

In a case in which the rotational speed of the motor 10 is low, the oil that is stored in the oil reservoir 30 of the rotor shaft 12 flows via the first oil paths 50, the cooling oil wells 52 and the second oil paths 54 of the rotor core 14 to the third oil paths 60 of the end plates 16A, 16B due to centrifugal force.

The third oil path 60 at the end plate 16A is described hereinafter, but operation of the third oil path 60 of the end plate 16B is similar.

At this time, because the centrifugal force that acts on the oil is relatively small, the amounts of oil that flow from the eight first oil paths 50A through 50H to the second oil paths 54A through 54H are insufficient, and further, there is dispersion in the amounts of oil that are supplied to the respective second oil paths 54A through 54H.

As a result, there is the concern that the temperatures of the eight magnets 40A through 40H (42A through 42H) that are cooled by the oil flowing through the second oil paths 54 will differ.

At the motor 10, the oil that is supplied to the respective second oil paths 54 reaches the third oil paths 60 of the end plate 16A. Here, at the region where the angle mitigating member 70 is disposed at the third oil path 60, because the conduit sectional area is reduced (a narrowed portion is provided), and further, because the rotational speed of the motor 10 is low, the flow rate of the oil that is due to the centrifugal force is relatively low, and the oil cannot pass by the position where the angle mitigating member 70 of the third oil path 60 is disposed, and returns to the second oil path 54 (refer to arrows V1 in FIG. 3A).

Due thereto, even in a case in which there are insufficient amounts of oil in the second oil paths 54, the amounts of the oil that are immediately discharged to the exterior from the third oil paths 60 are suppressed, and the second oil paths 54 are filled with sufficient amounts of oil. Namely, even if there is dispersion in the amounts of oil of the eight second oil paths 54A through 54H, oil being immediately discharged from the third oil paths 60A through 60H to the exterior is prevented or suppressed. As a result, sufficient amounts of oil are filled in all of the eight second oil paths 54A through 54H, and the respective magnets 40A through 40H, 42A through 42H can be cooled uniformly.

Further, due to the oil, which has returned back from the set position of the angle mitigating member 70 of the third oil path 60, giving rise to convection within the second oil path 54 (refer to arrows V1 in FIG. 3A), the performance of cooling the magnets 40, 42 is improved.

Moreover, because the angle that is formed by the axial direction portion 62 and the radial direction portion 64 of the third oil path 60 is a right angle, it is easy to manufacture the third oil path 60 within the end plate 16A. Further, because the angle that is formed by the axial direction portion 62 and the radial direction portion 64 is a right angle, due to this bend, large conduit resistance is ensured at the third oil path 60, and the angle mitigating member 70 is disposed thereat, and sufficient conduit resistance can be ensured at the third oil path 60.

Note that, if a sufficient amount of oil is stored in the second oil path 54, the amount of oil that is supplied to the third oil path 60 is sufficiently large, and oil is discharged from the third oil path 60 to the exterior regardless of the conduit resistance of the third oil path 60.

On the other hand, in a case in which the rotating speed of the motor 10 is high, the oil that is stored in the oil reservoir 30 of the rotor shaft 12 flows via the first oil paths 50 and the cooling oil wells 52 of the rotor core 14 to the second oil paths 54 due to centrifugal force.

At this time, because the centrifugal force that acts on the oil is relatively large, sufficient amounts of oil flow from the oil reservoir 30 via the eight first oil paths 50A through 50H to the respective second oil paths 54A through 54H.

As a result, the flow rate of the oil that flows from the respective second oil paths 54 to the third oil paths 60 of the end plate 16A is sufficiently fast. Further, even though the conduit sectional area is reduced by the portion where the angle mitigating member 70 is disposed in the third oil path 60 (where a narrowed portion is provided), the bending angle of the third oil path 60 is mitigated by the angle mitigating member 70. Accordingly, oil passes by the set position of the angle mitigating member 70 in the third oil path 60, and is discharged to the exterior from the radial direction portion 64 (refer to arrows V2 in FIG. 3B). Namely, the oil flows through the second oil path 54 at high speed, and the magnets 40, 42 are cooled sufficiently by the heat exchange with the oil.

In particular, because the angle that is formed by the axial direction portion 62 and the radial direction portion 64 of the third oil path 60 is mitigated from a right angle by the inclined surface 72 of the angle mitigating member 70, the increase in the conduit resistance due to the narrowing is compensated for by the decrease in the conduit resistance that is due to the mitigating of the angle at the corner portion (the bend), and the oil discharging ability at the time when the motor rotates at high speed is ensured.

For example, as compared with a case in which a plate that is rectangular in an axial direction cross-section is disposed at the radial direction portion 64 so as to form a narrowed portion that reduces the conduit sectional area, the range over which the flow rate is reduced of the oil is suppressed relatively in a case in which the angle mitigating member 70 is provided. Namely, in a case in which the flow rate of the oil is fast (the rotational speed of the motor 10 is high), oil is discharged smoothly from the third oil path 60 to the exterior regardless of the fact that the angle mitigating member 70 is provided thereat.

Note that, as shown in FIG. 1, the oil that is discharged from the third oil paths 60 of the end plate 16A toward the radial direction outer side is applied to the inner peripheral surfaces of the stator core 18 and the coil end 20A that are at the outer side of the end plate 16A. Due thereto, the stator core 18 and the coil end 20A can be cooled.

[Second Embodiment]

An oil-cooling structure for magnets of a motor relating to a second embodiment of the present disclosure is described with reference to FIG. 1, FIG. 2, FIG. 4A and FIG. 4B. Structural elements that are similar to those of the first embodiment are denoted by the same reference numerals, and detailed description thereof is omitted.

At a motor 100, what is different from the motor 10 of the first embodiment is only the shape of the third oil paths 60 that are provided in the end plates 16A, 16B, and therefore, these portions are described. Note that only the third oil paths 60 of the end plate 16A are described, but the third oil paths 60 of the end plate 16B have similar structures as and the same operation and effects as the third oil paths 60 of the end plate 16A, and therefore, description thereof is omitted.

Figure 4A:
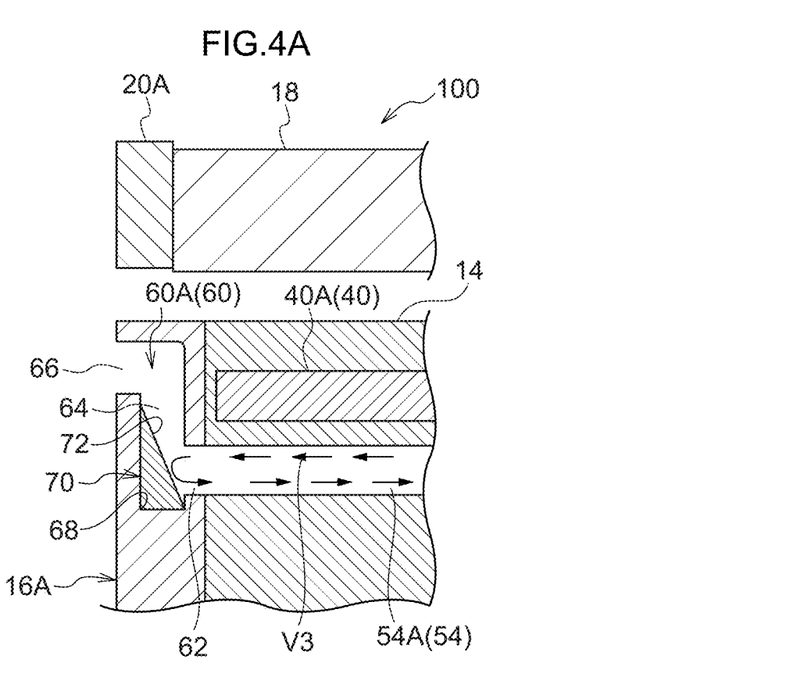
FIG. 4A is an axial direction cross-sectional view showing main portions of a motor to which an oil-cooling structure for magnets of a motor relating to a second embodiment is applied, and shows a time of low speed rotation of the motor.

As shown in FIG. 4A, the third oil path 60 that is formed at the interior of the end plate 16A has the axial direction portion 62 that extends from the axial direction inner side end surface of the end plate 16A toward the axial direction outer side, the radial direction portion 64 that extends from the axial direction outer side end portion of the axial direction portion 62 toward the radial direction outer side, and an opening portion 66 that extends from the radial direction outer side end portion of the radial direction portion 64 toward the axial direction outer side. Namely, as shown in FIG. 4A, the third oil path 60 is shaped as a crank that is bent twice.

Note that the radial direction portion 64 and the opening portion 66 corresponds to the "discharging portion".

The angle mitigating member 70 is disposed similarly to the first embodiment.

(Operation)

In the case of the motor 100, because the third oil path 60 that is provided in the end plate 16A is bent twice, the conduit resistance of the third oil path 60 is increased further. Accordingly, at the time of low-speed rotation of the motor 100, the oil that reaches the third oil path 60 from the second oil path 54 is bounced-back (refer to arrows V3 in FIG. 4A) at the region where the angle mitigating member 70 is disposed in the third oil path 60, and the bend at the radial direction portion 64 and the opening portion 66 is a portion where there is conduit resistance, and the discharging of oil to the exterior is further prevented or suppressed.

As a result, even if there are small amounts of oil that reach the second oil paths 54 at the time of low-speed rotation of the motor 100, oil being discharged from the third oil paths 60 is suppressed, and oil is sufficiently stored in the second oil paths 54A through 54H. In this way, after sufficient amounts of oil are supplied to the respective second oil paths 54 that are formed at eight places in the peripheral direction, oil is discharged from the third oil paths 60.

Accordingly, the eight magnets 40A through 40H, 42A through 42H are cooled uniformly, and the temperatures thereof are made uniform.

Figure 4B:
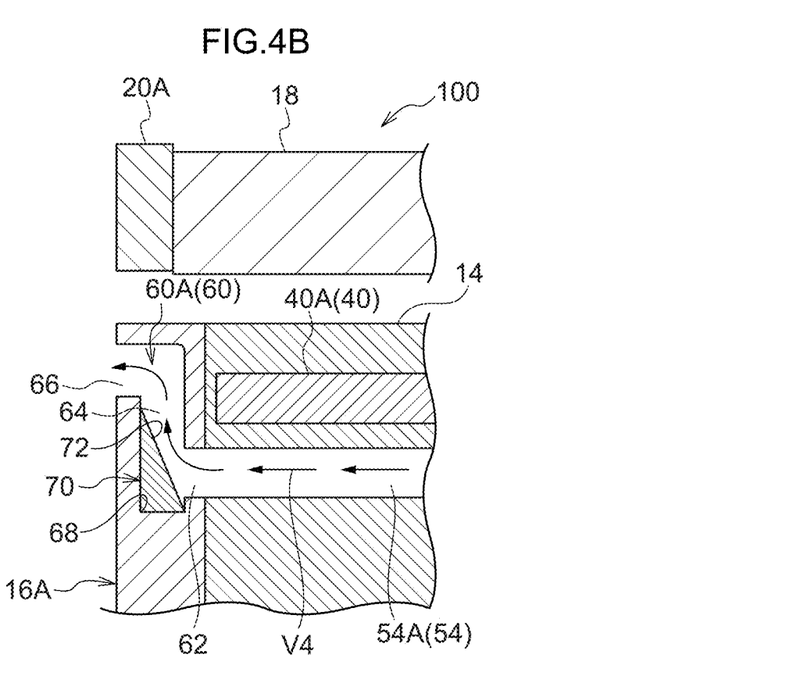
FIG. 4B is an axial direction cross-sectional view showing main portions of the motor to which the oil-cooling structure for magnets of a motor relating to the second embodiment is applied, and shows a time of high speed rotation of the motor.

On the other hand, at the time of high-speed rotation of the motor 100, because the oil reaches the third oil path 60 from the second oil path 54 at a sufficient flow rate, the oil passes the position where the angle mitigating member 70 is disposed in the third oil path 60 (the narrowed portion), and is discharged from the opening portion 66 to the axial direction outer side (refer to arrows V4 in FIG. 4B).

Namely, in a case in which it is not necessary to cool the stator core 18 and the coil ends 20A, 20B by oil, the conduit resistance is increased even more by bending the third oil path 60 twice at 90°. In a case in which the rotational speed of the motor is low, it can be made such that oil is not immediately discharged from the third oil path 60 to the exterior even more so, and therefore, the cooling performance can be improved even more.

(Other Points)

In the first and second embodiments, the angle mitigating member 70 is made to be right triangular in cross-section, but the present disclosure is not limited to this. It suffices to form an inclined surface such that the angle that is formed by the axial direction portion 62 and the radial direction portion 64 of the third oil path 60 of the end plate 16A, 16B (which angle is at 90° in the above embodiments) is mitigated. Two or more inclined surface may be formed, or, the angle mitigating member may be formed in another shape. However, the conduit sectional area of the third oil path 60 at the position where the angle mitigating member 70 of the third oil path 60 is disposed must be reduced, and the angle mitigating member must function to narrow the third oil path 60.

Further, the first and second embodiments describe the angle mitigating member 70 as a separate member that is disposed within the third oil path 60 of the end plate 16A, 16B, but the angle mitigating member may be formed integrally with the end plate 16A, 16B.

Although embodiments have been described above, the present disclosure can be implemented in various forms within a scope that does not depart from the gist thereof.

An object of the present disclosure is to provide an oil-cooling structure for magnets of a motor and a motor that ensure a magnet cooling performance regardless of the rotational speed of the motor.

A first aspect is an oil-cooling structure for motor magnets, that includes: a rotor shaft; a rotor core mounted at an outer peripheral surface of the rotor shaft, which rotates integrally with the rotor shaft; a plurality of magnets disposed along a peripheral direction at an interior of the rotor core, and respectively extending along an axial direction of the rotor shaft; an oil reservoir formed at an interior of the rotor shaft, to which oil is supplied from an exterior; a plurality of first oil paths extending from the oil reservoir at an interior of the rotor core in radial directions to a plurality of cooling oil holes that are formed at radial direction inner sides of the plurality of magnets, respectively; a plurality of second oil paths extending along the axial direction at radial direction inner sides of the magnets, respectively, and reaching axial direction end portions of the rotor core from the cooling oil holes; a pair of end plates that are disc-shaped and are mounted at both end portions of the rotor core; third oil paths formed at interiors of the end plates, and having axial direction portions that extend in the axial direction and are connected to axial direction end portions of the second oil paths, respectively, and discharging portions that extend toward a radial direction outer side from axial direction outer side end portions of the axial direction portions and are open at end portions of the end plates; and angle mitigating members disposed in the third oil paths at corner portions formed by the axial direction portions and the discharging portions, configured to mitigate angles formed by the axial direction portions and the discharging portions in axial direction cross-sections that include the third oil paths.

In this oil-cooling structure for magnets of a motor, centrifugal force acts on the oil, which is stored in the oil reservoir of the rotor shaft, due to the rotation of the rotor shaft and the rotor core. Oil is supplied from the oil reservoir to the cooling oil holes via the first oil paths that extend toward the radial direction outer sides. Moreover, from the cooling oil holes, the oil reaches axial direction end portions of the second oil paths that extend along the axial direction at the radial direction inner sides of the magnets, and is discharged out to the exterior via the third oil paths of the end plates.

In this way, cooling of the magnets is carried out due to oil flowing in the second oil paths that are provided at the radial direction inner sides of the magnets.

By the way, in a case in which the rotating speed of the motor is low, the centrifugal force that acts on the oil within the rotor shaft and the rotor core is small. Therefore, sufficient amounts of oil are not supplied from the oil reservoir via the first oil paths, which extend toward the radial direction outer sides, to the plural second oil paths respectively.

In particular, the plural magnets are disposed at the rotor core along the peripheral direction, and the plural first oil paths are formed in a radial form with respect to (the cooling oil holes at) the radial direction inner sides of the respective magnets. Accordingly, there is the concern that dispersion will arise in the amounts of oil that are supplied from the oil reservoir to the plural second oil paths via the plural first oil paths.

In this oil-cooling structure for magnets of a motor, the angle mitigating members are disposed at the corner portions that are formed by the axial direction portions and the discharging portions at the third oil paths that are formed in the end plates. Due thereto, the flow path sectional areas of the third oil paths are reduced (narrow portions are formed) at the positions where the angle mitigating members are disposed.

On the other hand, in a case in which the rotational speed of the motor (the centrifugal force) is low, the amounts of oil that arrive at the second oil paths are small (the flow rate of the oil is low).

Here, because the flow path sectional areas are reduced at the positions where the angle mitigating members of the third oil paths are disposed (narrowed portions are provided), the oil that arrives at the third oil paths of the end plates from the second soil paths being discharged to the exterior from the discharging portions is suppressed by the increase in the conduit resistance at the positions where the angle mitigating members are provided.

As a result, the oil that arrives at the third oil paths is reflected at the positions where the angle mitigating members of the third oil paths are disposed, and is returned to the second oil paths, and convective flow with the other oil is generated within the second oil paths. Due thereto, the performance of cooling the magnets improves.

Further, up until sufficient amounts of oil are supplied from the oil reservoir of the rotor shaft via the first oil paths and the cooling oil holes to the second oil paths, discharging of oil from the third oil paths to the exterior is prevented or suppressed. Namely, even if the amounts of oil that are supplied to the plural second oil paths that are formed at the radial direction inner sides of the plural magnets that are disposed within the rotor core along the peripheral direction are not uniform, while discharging of oil from the third oil paths to the exterior is being prevented or suppressed, sufficient amounts of oil are supplied to the respective second oil paths, and the oil amounts of the plural second oil paths are made uniform.

As a result, non-uniformity of the temperatures of the plural magnets is suppressed, and a deterioration in the performances of the motor is prevented or suppressed.

Note that, when oil is stored to sufficient amounts in the second oil paths, the amounts of oil that are supplied to the third oil paths are sufficiently large, and oil is discharged from the third oil paths to the exterior regardless of the conduit resistances of the third oil paths.

On the other hand, in a case in which the rotational speed of the motor is high, there is a sufficient amount (flow rate) of the oil that arrives at the end portions of the second oil paths. Therefore, at the third oil paths of the end plates, the oil passes also by the places where the angle mitigating members are provided, and is discharged to the exterior. Namely, due to sufficient amounts of oil being made to flow to the second oil paths at a high flow rate, a good cooling performance can be ensured.

Further, the flow path sectional areas of the third oil paths are reduced (narrowed portions are provided) due to the angle mitigating members being provided, and the angles that are formed by the axial direction portions and the discharging portions are mitigated by the angle mitigating members. Therefore, in a case in which the flow rate of the oil (the rotational speed of the motor) is high, the ability to discharge oil to the exterior is ensured.

A second aspect is the oil-cooling structure for motor magnets of the first aspect, wherein the axial direction portions and the discharging portions form right angles in axial direction cross-sections of the end plates that include the third oil paths.

If the angles that are formed by the axial direction portions and the discharging portions that structure the third oil paths are right angles, manufacturing of the axial direction portions and the discharging portions within the end plates is easy, and the conduit resistances of the third oil paths due to the formation of the corner portions are sufficiently large. Together with the provision of the angle mitigating members in the third oil paths, the conduit resistances of the third oil paths can be set to be sufficiently large. As a result, in a case in which the rotational speed of the motor is low, oil being discharged immediately from the third oil paths can be sufficiently prevented or suppressed.

A third aspect is the oil-cooling structure for motor magnets of the first or second aspect, wherein the discharging portions extend from axial direction outer side end portions of the axial direction portions toward radial direction outer sides of the end plates, and radial direction outer side end portions of the discharging portions are open at outer peripheral surfaces of the end plates.

In this oil-cooling structure for magnets of a motor, the discharging portions of the third oil paths of the end plates extend toward the radial direction outer sides from the axial direction portion outer side end portions, and open at the outer peripheral surfaces of the end plates.

Accordingly, the oil, which has arrived at the third oil paths of the end plates from the second oil paths of the rotor core, reaches the discharging portions from the axial direction portions of the third oil paths, and is discharged to the exterior from the other peripheral surfaces of the end plates. Namely, the oil, which is discharged out from the third oil paths, is applied to the coil ends or the stator core that are positioned at the radial direction outer sides of the end plates at the motor, and cooling can be carried out.

A fourth aspect is the oil-cooling structure for motor magnets of the first or second aspect, wherein the discharging portions have radial direction portions that extend from axial direction outer side end portions of the axial direction portions toward radial direction outer sides of the end plates, and opening portions that extend from radial direction outer side end portions of the radial direction portions toward axial direction outer sides and are open at axial direction outer side end surfaces of the end plates.

In this oil-cooling structure for magnets of a motor, the discharging portions of the third oil paths that are formed in the end plates have the radial direction portions that extend toward the radial direction outer side from the axial direction outer side end portions of the axial direction portions, and the opening portions that head toward the axial direction outer side end surfaces of the end plates from the radial direction outer side end portions of the radial direction portions. Therefore, the third oil paths are structures that are bent twice, and the conduit resistances thereof increase.

Namely, in a case in which the rotating speed of the motor is low, the amounts of oil that are discharged from the second oil paths via the third oil paths to the exterior decrease even more. The storing of oil in the second oil paths up until sufficient amounts of oil are supplied to the second oil paths is ensured even more, and the magnets can be cooled sufficiently.

A fifth aspect is a motor, that includes the oil-cooling structure for motor magnets of any of the first to fourth aspects.

This motor has the oil-cooling structure for magnets of a motor of any of the first aspect through the fourth aspect. Therefore, at the time of low-speed rotation, oil being immediately discharged to the exterior from the second oil paths that are for cooling the respective magnets that are disposed at plural positions along the peripheral direction of the rotor core is prevented or suppressed. Therefore, the amounts of oil that are filled in the respective second oil paths are made uniform, and the performances of cooling the respective magnets are made uniform. Namely, the temperatures of the respective magnets are made uniform, and the performances of the motor can be maintained well.

On the other hand, at the time of high-speed rotation of the motor, sufficient amounts of oil are supplied to the respective second oil paths, and oil is discharged well from the third oil paths. Due thereto, the performance of cooling the respective magnets is ensured, and the motor is maintained well.

As described above, in accordance with the oil-cooling structure for magnets of a motor and the motor relating to the present disclosure, the performance of cooling magnets can be ensured regardless of the rotational speed of the motor.

What is claimed is:

1. An oil-cooling structure for motor magnets, the oil-cooling structure comprising:
a rotor shaft;
a rotor core mounted at an outer peripheral surface of the rotor shaft, which rotates integrally with the rotor shaft;
a plurality of magnets disposed along a peripheral direction at an interior of the rotor core, and respectively extending along an axial direction of the rotor shaft;
an oil reservoir formed at an interior of the rotor shaft, to which oil is supplied from an exterior;
a plurality of first oil paths extending from the oil reservoir at an interior of the rotor core in radial directions to a plurality of cooling oil holes that are formed at radial direction inner sides of the plurality of magnets, respectively;
a plurality of second oil paths extending along the axial direction at the radial direction inner sides of the plurality of magnets, respectively, and reaching axial direction end portions of the rotor core from the plurality of cooling oil holes;
a pair of end plates that are disc-shaped and are mounted at both end portions of the rotor core;
third oil paths formed at interiors of the end plates, and having
axial direction portions that extend in the axial direction and are connected to axial direction end portions of the second oil paths, respectively, and
discharging portions that extend toward a radial direction outer side from axial direction outer side end portions of the axial direction portions and are open at end portions of the end plates; and
angle mitigating members disposed in the third oil paths at corner portions formed by the axial direction portions and the discharging portions, the angle mitigating members being configured to mitigate angles formed by the axial direction portions and the discharging portions in axial direction cross-sections that include the third oil paths,
wherein
the axial direction portions and the discharging portions form right angles in axial direction cross-sections of the end plates that include the third oil paths, and
the angle mitigating members are right-triangular in axial direction cross-section, right-angled portions of the angle mitigating members being disposed so as to conform to align with the corner portions formed by the axial direction portions and the discharging portions.

2. The oil-cooling structure of claim 1, wherein
the discharging portions extend from axial direction outer side end portions of the axial direction portions toward radial direction outer sides of the end plates, and
radial direction outer side end portions of the discharging portions are open at outer peripheral surfaces of the end plates.

3. The oil-cooling structure of claim 1, wherein
the discharging portions have
radial direction portions that extend from axial direction outer side end portions of the axial direction portions toward radial direction outer sides of the end plates, and
opening portions that extend from radial direction outer side end portions of the radial direction portions toward axial direction outer sides and are open at axial direction outer side end surfaces of the end plates.

4. A motor, comprising an oil-cooling structure for motor magnets, the oil-cooling structure including:
a rotor shaft;
a rotor core mounted at an outer peripheral surface of the rotor shaft, which rotates integrally with the rotor shaft;
a plurality of magnets disposed along a peripheral direction at an interior of the rotor core, and respectively extending along an axial direction of the rotor shaft;
an oil reservoir formed at an interior of the rotor shaft, to which oil is supplied from an exterior;
a plurality of first oil paths extending from the oil reservoir at an interior of the rotor core in radial directions to a plurality of cooling oil holes that are formed at radial direction inner sides of the plurality of magnets, respectively;
a plurality of second oil paths extending along the axial direction at the radial direction inner sides of the plurality of magnets, respectively, and reaching axial direction end portions of the rotor core from the plurality of cooling oil holes;
a pair of end plates that are disc-shaped and are mounted at both end portions of the rotor core;
third oil paths formed at interiors of the end plates, and having axial direction portions that extend in the axial direction and are connected to axial direction end portions of the second oil paths, respectively, and discharging portions that extend toward a radial direction outer side from axial direction outer side end portions of the axial direction portions and are open at end portions of the end plates; and
angle mitigating members disposed in the third oil paths at corner portions formed by the axial direction portions and the discharging portions, configured to mitigate angles formed by the axial direction portions and the discharging portions in axial direction cross-sections that include the third oil paths,
wherein
the axial direction portions and the discharging portions form right angles in axial direction cross-sections of the end plates that include the third oil paths, and
the angle mitigating members are right-triangular in axial direction cross-section, right-angled portions thereof being disposed so as to conform to align with the corner portions formed by the axial direction portions and the discharging portions.

* * * * *